(12) United States Patent
Fujisawa et al.

(10) Patent No.: US 11,722,046 B2
(45) Date of Patent: Aug. 8, 2023

(54) ELECTROMAGNETIC COUPLING DEVICE

(71) Applicant: OGURA CLUTCH CO., LTD., Gunman (JP)

(72) Inventors: Yoshinori Fujisawa, Gunma (JP); Yukihiro Hara, Gunma (JP); Shinya Ozaki, Gunma (JP); Toshihiro Takahara, Gunma (JP)

(73) Assignee: OGURA CLUTCH CO., LTD., Gunma (JP)

( * ) Notice: Subject to any disclaimer, the term of this patent is extended or adjusted under 35 U.S.C. 154(b) by 0 days.

(21) Appl. No.: 17/655,692

(22) Filed: Mar. 21, 2022

(65) Prior Publication Data

US 2022/0320989 A1 Oct. 6, 2022

(51) Int. Cl.
*H02K 11/25* (2016.01)
*H02K 49/10* (2006.01)

(52) U.S. Cl.
CPC ........... *H02K 49/108* (2013.01); *H02K 11/25* (2016.01)

(58) Field of Classification Search
CPC ........ H02K 11/00; H02K 11/25; H02K 49/00; H02K 49/10; H02K 49/108; H01F 3/00; H01F 3/10; H01F 7/00; H01F 7/16; H01F 7/163; H01F 7/1638
See application file for complete search history.

(56) References Cited

U.S. PATENT DOCUMENTS

| 5,812,044 A | 9/1998 | Sakamoto | |
| 6,404,086 B1 * | 6/2002 | Fukasaku | H02K 7/14 310/43 |
| 2011/0148562 A1 | 6/2011 | Oh et al. | |

FOREIGN PATENT DOCUMENTS

| JP | 58-008998 Y2 | 2/1983 | |
| JP | H1151085 A * | 2/1999 | ............. F16D 27/10 |
| JP | 2011069489 A * | 4/2011 | ............. F16D 27/11 |

OTHER PUBLICATIONS

European Search Report and Search Opinion received for EP Patent Application No. 22163438.9, dated Sep. 28, 2022, 5 pages.

* cited by examiner

*Primary Examiner* — Tran N Nguyen
(74) *Attorney, Agent, or Firm* — Womble Bond Dickinson (US) LLP

(57) ABSTRACT

An electromagnetic coupling device includes an electromagnetic coil, a field core including a recessed portion containing the electromagnetic coil, and a terminal block inserted in a hole passing through the wall of the recessed portion. The terminal block includes a terminal portion projecting outside the field core, a pair of terminals provided at the terminal portion, and a pair of through holes passing through the terminal block via the pair of terminals. The winding start end and winding termination end of the electromagnetic coil pass through the pair of through holes, project from the pair of terminals, and are soldered to the pair of terminals together with a pair of external connection lead wires.

13 Claims, 16 Drawing Sheets

FRONT ← → REAR

FRONT ←→ REAR

A ⟷

REAR ⟷ FRONT

RELATED ART

ELECTROMAGNETIC COUPLING DEVICE

BACKGROUND OF THE INVENTION

The present invention relates to an electromagnetic coupling device such as an electromagnetic clutch or electromagnetic brake and, more particularly, to a connection structure between the magnet wire of an electromagnetic coil, and an external connection lead wire and a surge voltage absorber.

In an electromagnetic coupling device such as an electromagnetic clutch or electromagnetic brake, an annually formed electromagnetic coil is contained in the annular recessed portion of a field core, as disclosed in, for example, Japanese Utility Model Publication No. 58-8998 (literature 1). External connection lead wires and a surge voltage absorber are connected to the start and termination ends of the electromagnetic coil. As shown in FIG. 17, a lead wire 4 is connected between an inner bottom surface 2a of an annular recessed portion 2 of a field core 1, and a side surface 3a of an electromagnetic coil 3 contained in the annular recessed portion 2.

Positioning the lead wire 4 between the side surface 3a of the electromagnetic coil 3 and the inner bottom surface 2a of the field core 1 generates a dead space DS in FIG. 17. In the dead space DS, the electromagnetic coil 3 cannot be arranged in the field core 1. Hence, the field core 1 of a related electromagnetic coupling device upsizes by the dead space DS in the axial direction (vertical direction in FIG. 17), and the number of turns of the electromagnetic coil 3 decreases.

SUMMARY OF THE INVENTION

It is an object of the present invention to reduce a dead space in a field core, and downsize the field core in the axial direction or increase the number of turns of an electromagnetic coil.

To achieve the above object, there is provided an electromagnetic coupling device according to the present invention comprising: an electromagnetic coil formed by winding a magnet wire including a winding start end and a winding termination end; a pair of external connection lead wires including a first lead wire and a second lead wire; a field core including a recessed portion containing the electromagnetic coil, and a hole passing through a wall of the recessed portion; and a terminal block inserted in the hole and supported by the field core, wherein the terminal block includes: a terminal portion projecting outside the field core; a pair of terminals provided at the terminal portion and including a first terminal and a second terminal; and a first pair of through holes including a first through hole and a second through hole that pass through the terminal block via the first terminal and the second terminal, respectively, and make an outside of the field core and an inside of the recessed portion communicate with each other, the winding start end passes through the first through hole, projects from the first terminal, and is soldered to the first terminal together with the first lead wire, and the winding termination end passes through the second through hole, projects from the second terminal, and is soldered to the second terminal together with the second lead wire.

DESCRIPTION OF THE PREFERRED EMBODIMENTS

First Embodiment

An embodiment of an electromagnetic coupling device according to the present invention will be described below in detail with reference to FIGS. 1 to 12. In this embodiment, the present invention is applied to an electromagnetic clutch.

Figure 1:
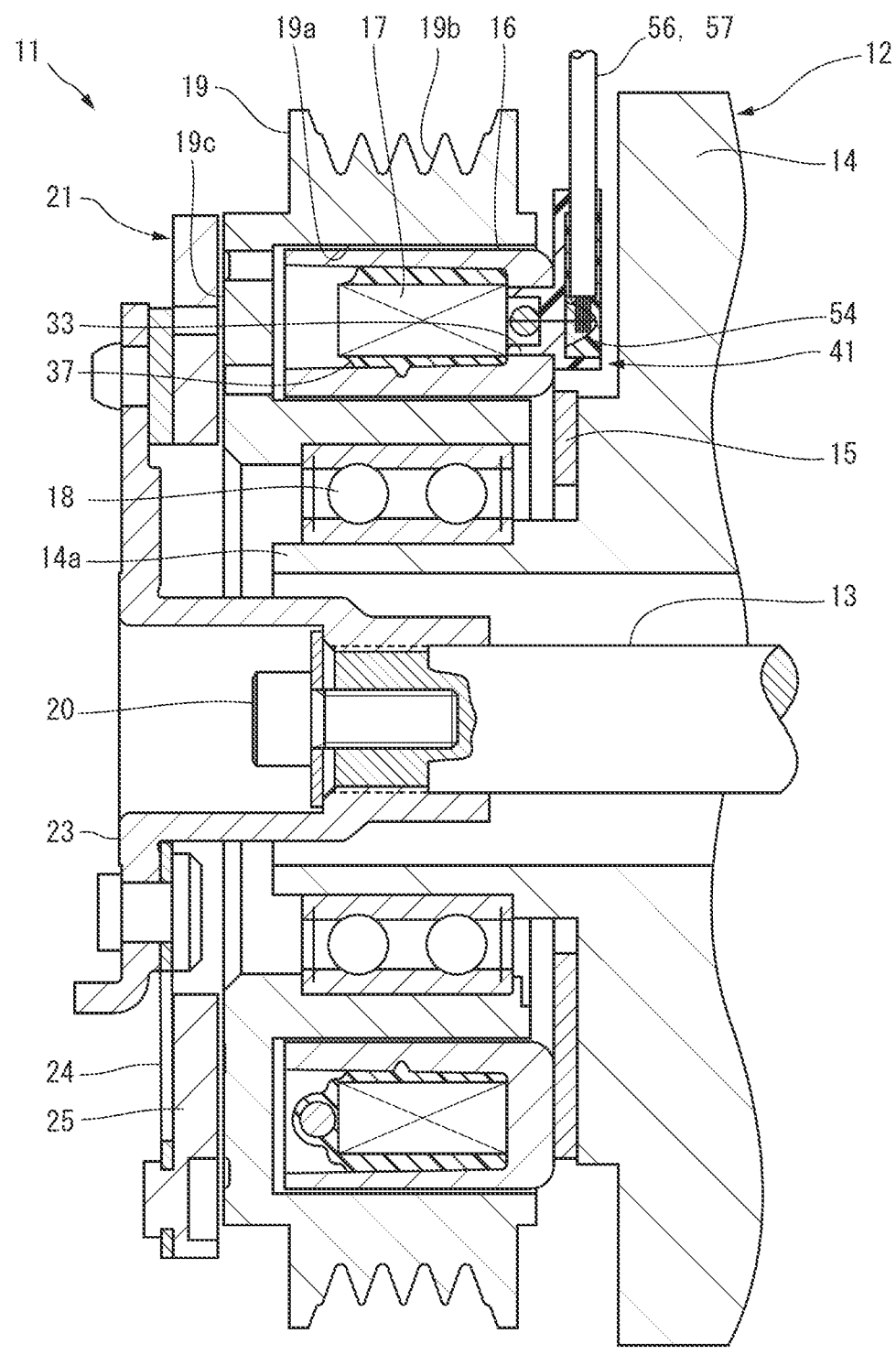
FIG. 1 is a sectional view of the first embodiment of an electromagnetic coupling device according to the present invention.

An electromagnetic clutch 11 shown in FIG. 1 transfers power to a rotating shaft 13 of a compressor 12 for a car air conditioner, and cuts off the transfer of power. The electromagnetic clutch 11 includes an annular field core 16 fixed to a front housing 14 of the compressor 12 via a mounting plate 15. The field core 16 contains an annular electromagnetic coil 17. The electromagnetic clutch 11 also includes a rotor 19 rotatably supported by a bearing 18 on a cylindrical portion 14a of the front housing 14. Further, the electromagnetic clutch 11 includes an armature assembly 21 that is spline-fitted at the distal end of the rotating shaft 13 and prevented by a bolt 20 from coming off. The armature assembly 21 includes a hub 23 fixed to the rotating shaft 13, and an armature 25 supported by the hub 23 via a leaf spring 24.

Figure 2:
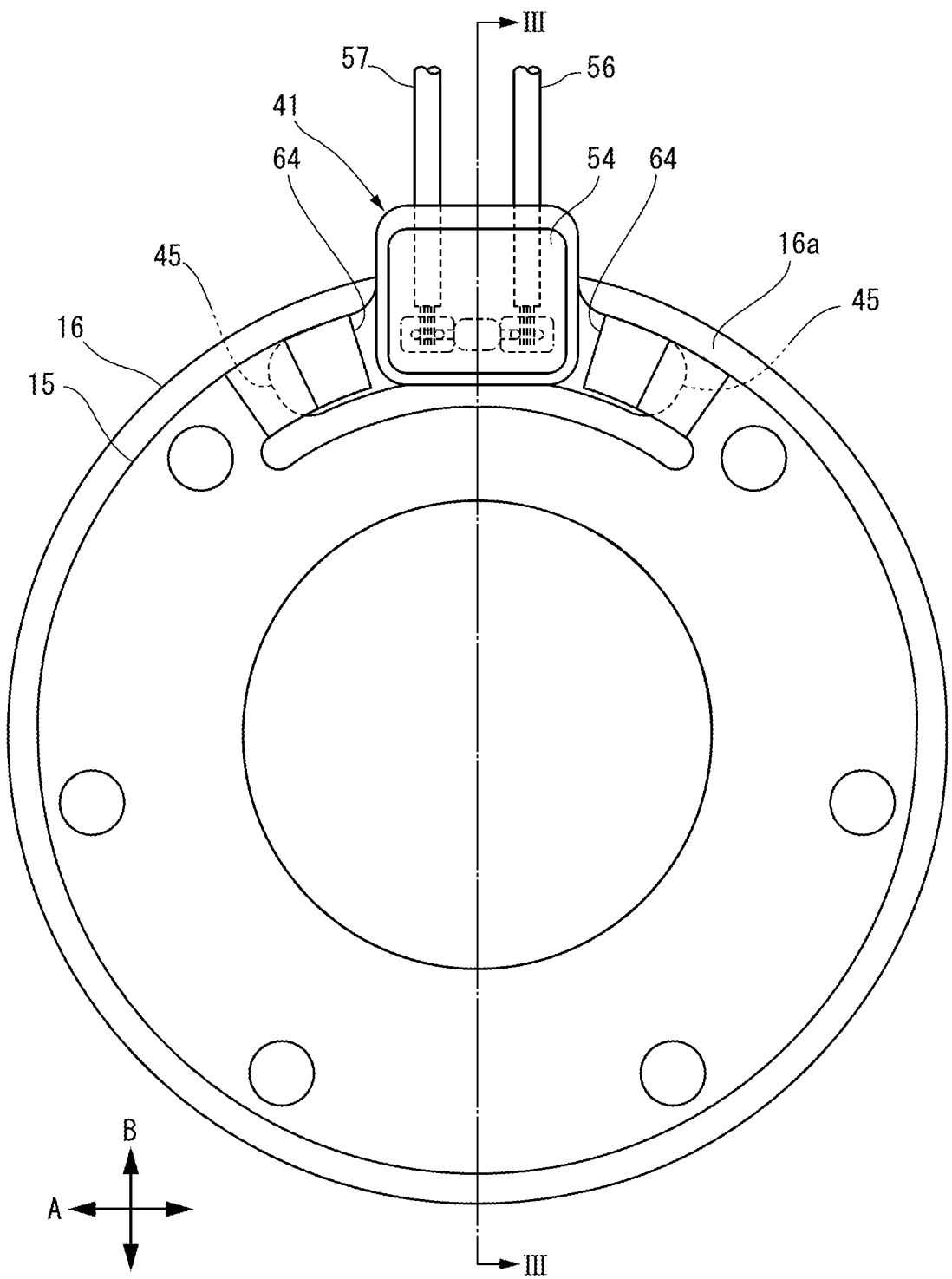
FIG. 2 is a front view of a field core assembly to which external connection lead wires are connected.
Figure 3:
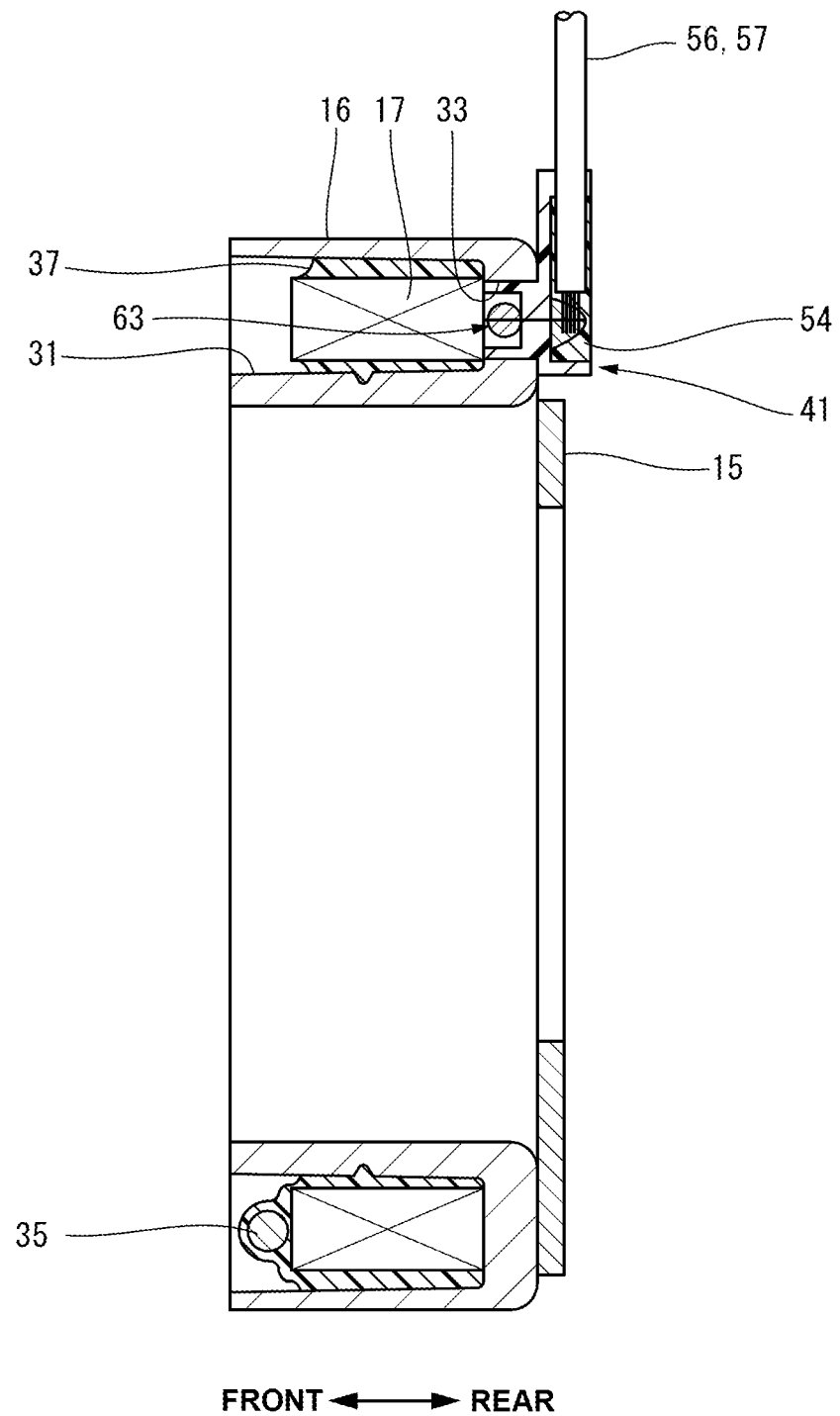
FIG. 3 is a sectional view taken along a line III-III in FIG. 2.

As shown in FIGS. 2 and 3, the whole field core 16 is annually formed and positioned on the same axis as that of the rotating shaft 13. As shown in FIG. 1, the field core 16 is inserted in an annular groove 19a formed in the rotor 19.

The rotor 19 rotates in a state in which the field core 16 is inserted in the annular groove 19a. A pulley groove 19b is formed in the outer surface of the rotor 19. The rotor 19 receives, for example, power of an engine (not shown) via a belt (not shown) wound in the pulley groove 19b. One end face of the rotor 19 in the axial direction has a frictional surface 19c facing the armature 25 of the armature assembly 21. In the following description, a direction in which the armature 25 is positioned with respect to the rotor 19 will be called "front of the electromagnetic clutch 11", and a direction opposite to this direction will be called "rear of the electromagnetic clutch 11".

In the electromagnetic clutch 11, the electromagnetic coil 17 inside the field core 16 is excited to attract the armature 25 to the rotor 19 by the magnetic force and transfer the rotation of the rotor 19 to the rotating shaft 13 via the armature assembly 21. When power supply to the electromagnetic coil 17 is stopped, the armature 25 is separated from the rotor 19 to cut off the transfer of power.

Figure 4A:
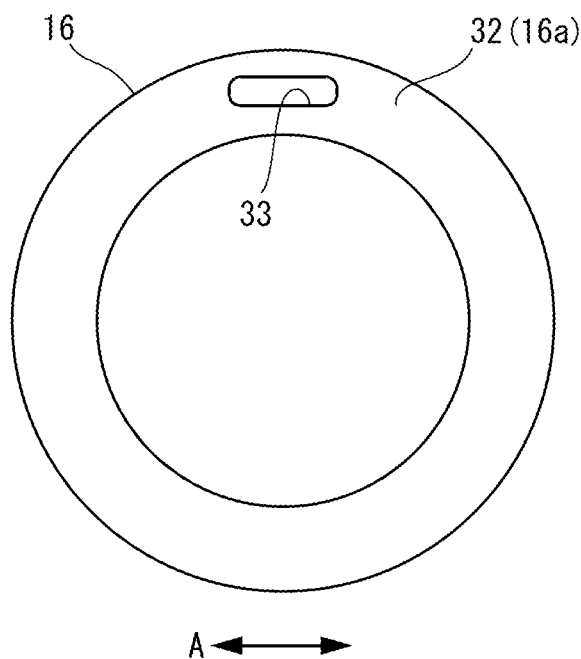
FIG. 4A is a bottom view of a field core.
Figure 4B:
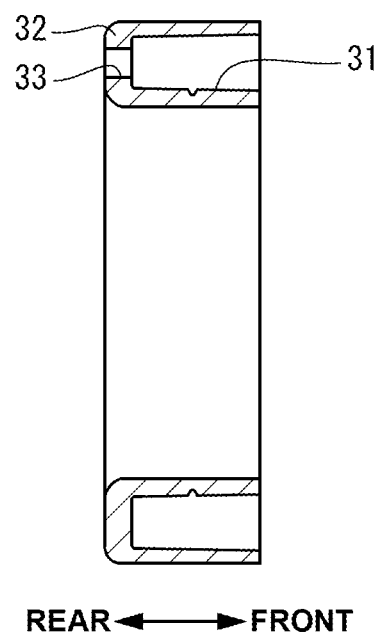
FIG. 4B is a sectional view of the field core.

As shown in FIGS. 4A and 4B, the field core 16 includes an annular groove 31 serving as a recessed portion that extends in the circumferential direction of the field core 16 and is open toward the front of the electromagnetic clutch 11, and a hole 33 passing through a bottom wall 32 of the annular groove 31. The annular groove 31 contains the electromagnetic coil 17.

Figure 5A:
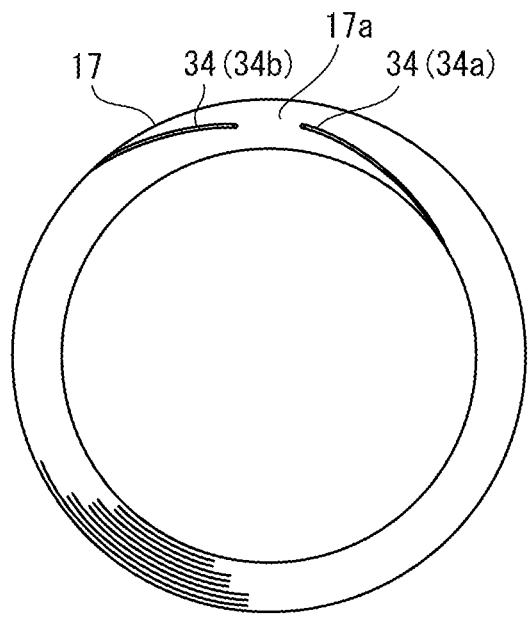
FIG. 5A is a bottom view of an electromagnetic coil.

As shown in FIG. 5A, the electromagnetic coil 17 is cylindrically formed by winding a wire, more specifically, a magnet wire 34. A winding start end 34a and winding termination end 34b of the magnet wire 34 are leaded out from the same portion in the circumferential direction at a rear-side end 17a serving as one end of the cylindrical electromagnetic coil 17 in the axial direction. The electromagnetic coil 17 is contained in the annular groove 31 of the field core 16 so that the rear-side end 17a faces the bottom wall 32 of the annular groove 31 of the field core 16.

Figure 5B:
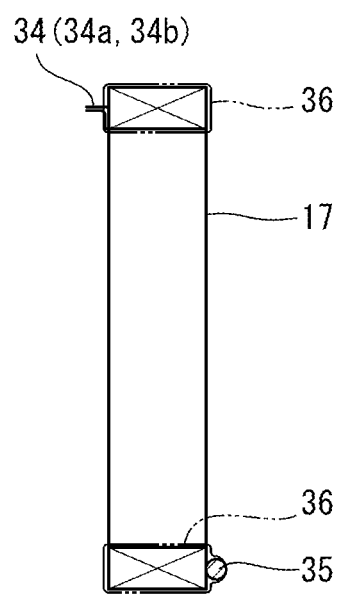
FIG. 5B is a sectional view of the electromagnetic coil.

As shown in FIG. 5B, a thermal fuse 35 is attached to a front-side end serving as the other end of the electromagnetic coil 17 in the axial direction. The thermal fuse 35 is electrically connected to the magnet wire 34 so as to form part of the winding of the electromagnetic coil 17. An insulating cotton tape 36 (see FIG. 5B) is wound on the outer and inner surfaces of the electromagnetic coil 17 and its two end faces in the axial direction. The annular groove 31 of the field core 16 is filled with an insulating cast resin (insulator) 37 in a state in which the electromagnetic coil 17 is inserted. The cast resin 37 is cured in the annular groove 31, fixing the electromagnetic coil 17 in the annular groove 31.

As shown in FIG. 4A, the hole 33 of the field core 16 is formed into an oval shape extending in a tangential direction A of the field core 16 when the field core 16 is viewed from the rear of the electromagnetic clutch 11. The hole 33 extends in the axial direction of the field core 16 and passes through the bottom wall 32 of the annular groove 31. As shown in FIGS. 1 and 3, a terminal block 41 is inserted in the hole 33.

Figure 6:
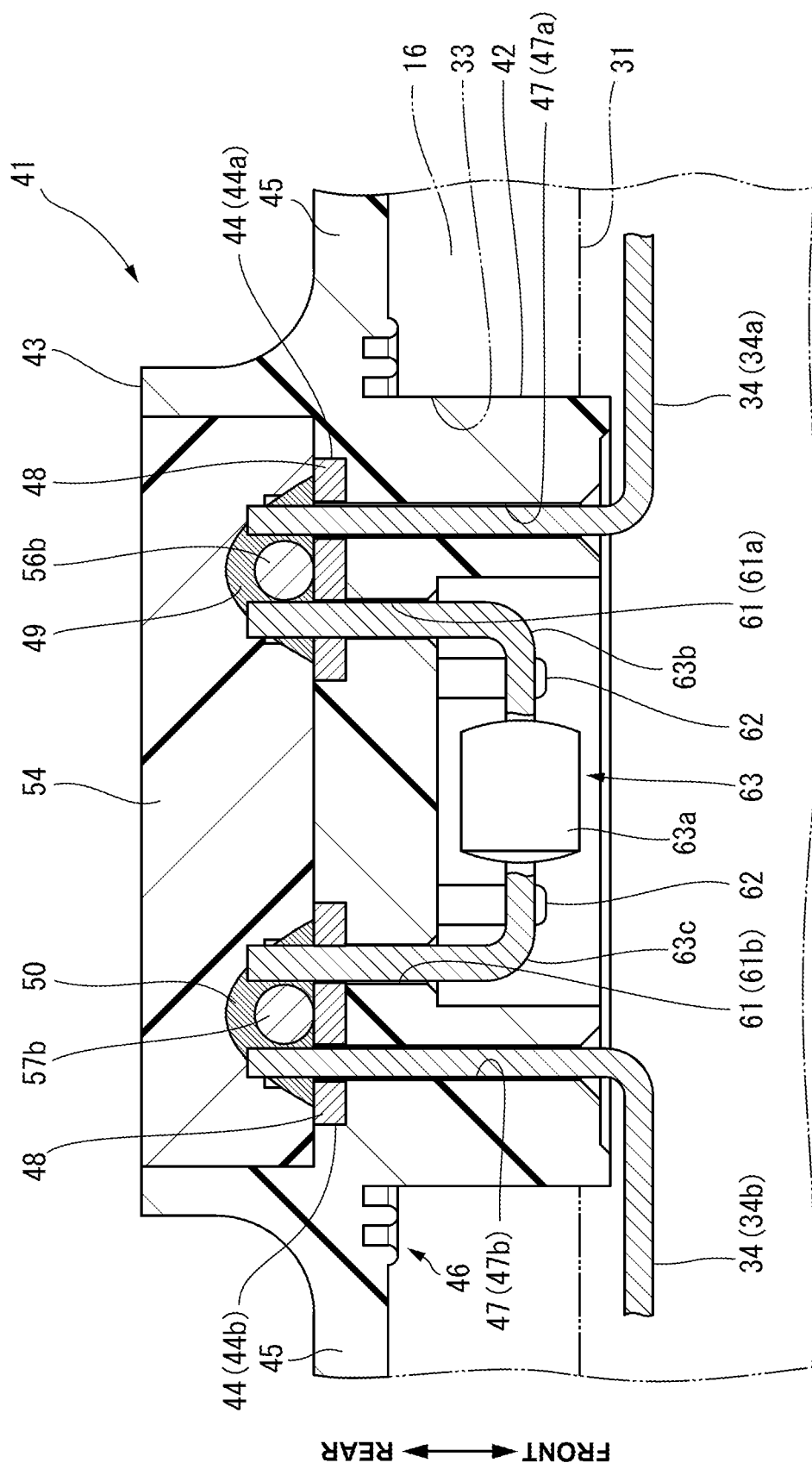
FIG. 6 is a sectional view of a terminal block according to the first embodiment.
Figure 7:
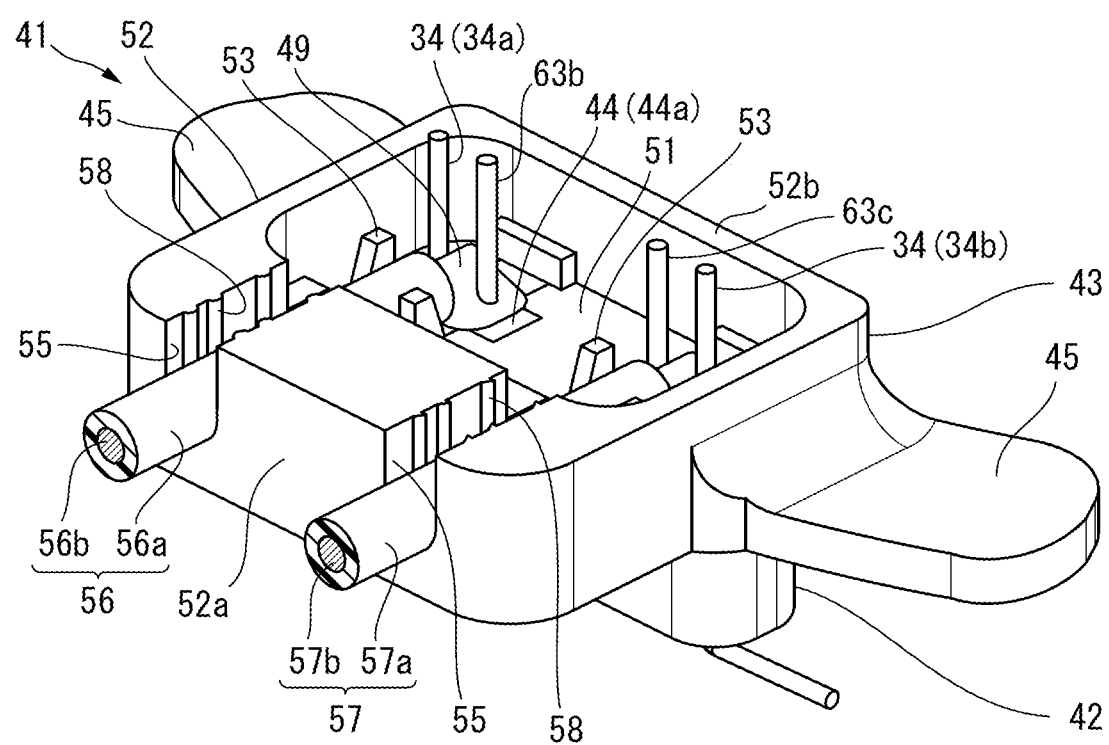
FIG. 7 is a perspective view of the terminal block according to the first embodiment.

The terminal block 41 is supported by the field core 16. As shown in FIGS. 6 and 7, the terminal block 41 includes an inner tube 42 fitted in the hole 33 of the field core 16, a terminal portion 43 projecting from the field core 16 to the rear (outside of the field core 16), a pair of terminals 44 provided at the terminal portion 43, and a pair of support pieces 45 projecting from the terminal portion 43 along a rear surface 16a (see FIG. 4A) serving as the external surface of the field core 16. The pair of terminals 44 include a first terminal 44a and a second terminal 44b. The inner tube 42, the terminal portion 43, and the pair of support pieces 45 are integrally formed from an insulating plastic material.

Figure 9:
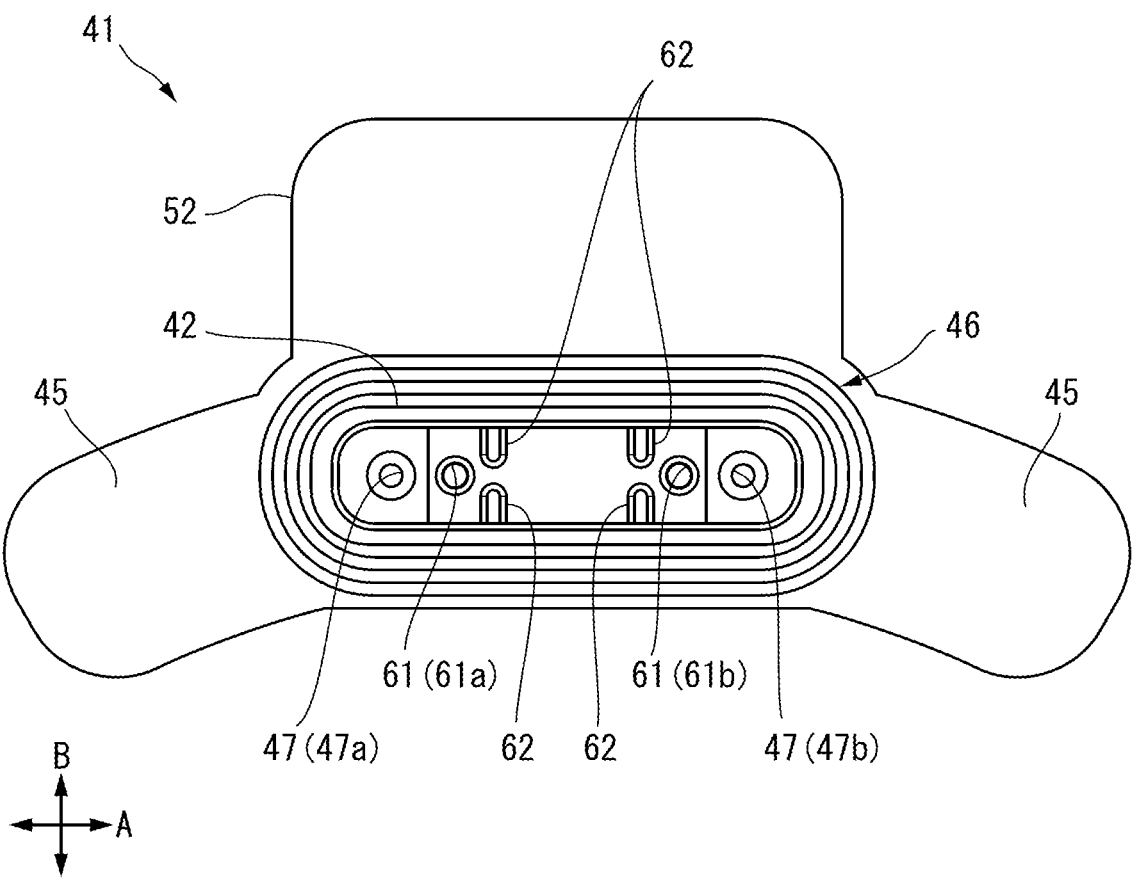
FIG. 9 is a bottom view of the terminal block according to the first embodiment when viewed from the field core side.
Figure 10:
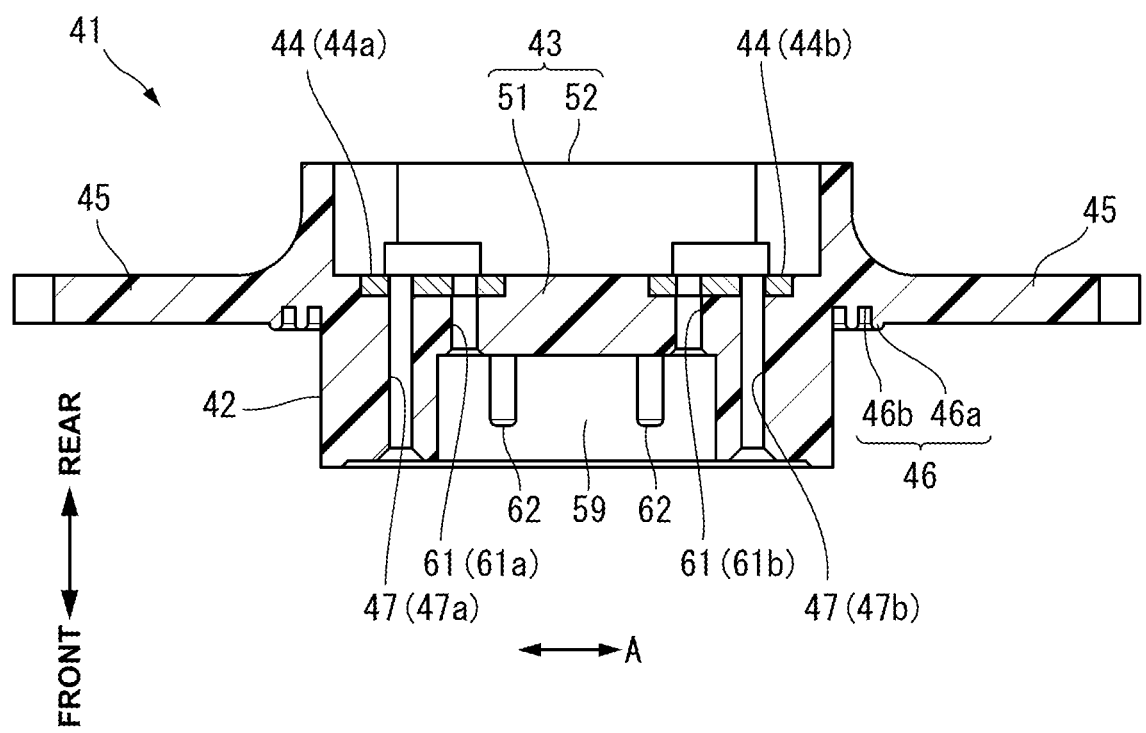
FIG. 10 is a sectional view taken along a line X-X in FIG. 8.

As shown in FIG. 9, the inner tube 42 is formed into an oval shape long in the tangential direction A (the right-and-left direction in FIG. 9) of the field core 16 when viewed from the axial direction. A plurality of ovals concentrically drawn to surround the inner tube 42 in FIG. 9 are lines representing a seal 46 formed on the back surfaces (surfaces facing the field core 16) of the terminal portion 43 and support pieces 45, as shown in FIG. 10. The seal 46 seals the gap between the terminal block 41 and the rear surface 16a of the field core 16, and is made up of a plurality of oval ridges 46a and a plurality of oval grooves 46b. The concentric ridges 46a and grooves 46b are so formed as to be laid out alternately. The seal 46 prevents the cast resin 37 injected in the annular groove 31, from leaking from outside the field core 16 through the gap between the hole 33 and the inner tube 42.

Figure 11:
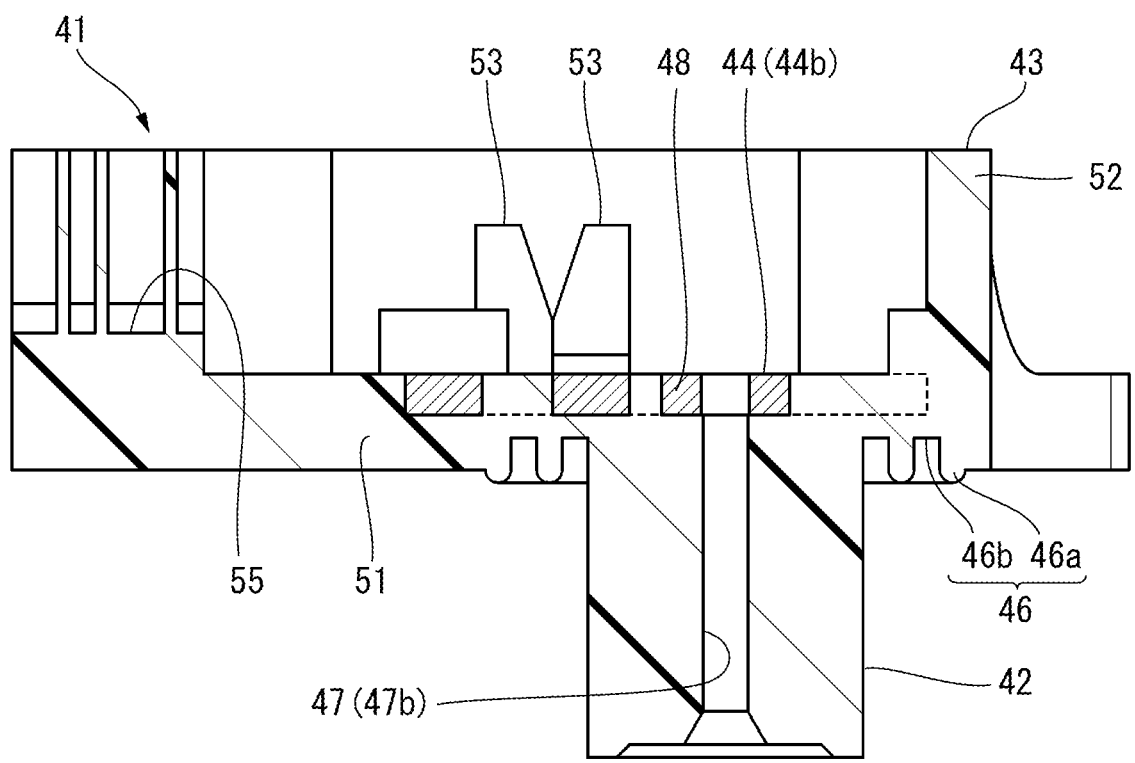
FIG. 11 is a sectional view taken along a line XI-XI in FIG. 8.

As shown in FIG. 10, a first pair of through holes 47 including a first through hole 47a and a second through hole 47b are bored in the inner tube 42 and the terminal portion 43 (terminal block body 51). As shown in FIG. 11, the first pair of through holes 47 pass through the terminal block 41 via plate portions 48 of the pair of terminals 44. The first pair of through holes 47 make the outside of the field core 16 and the inside of the annular groove 31 communicate with each other in a state in which the terminal block 41 is attached to the field core 16.

As shown in FIG. 6, the winding start end 34a of the magnet wire 34 passes through the first through hole 47a out of the first pair of through holes 47. The winding start end 34a passes through the first terminal 44a out of the pair of terminals 44, projects outside the terminal block 41, and is soldered at this projection to the first terminal 44a by a solder 49.

The winding termination end 34b of the magnet wire 34 passes through the second through hole 47b out of the first pair of through holes 47. The winding termination end 34b passes through the second terminal 44b out of the pair of terminals 44, projects outside the terminal block 41, and is soldered at this projection to the second terminal 44b by a solder 50.

As shown in FIG. 10, the terminal portion 43 includes the plate-like terminal block body 51 connected to one end (end positioned outside the field core 16) of the inner tube 42, and an outer tube 52 projecting from the terminal block body 51 to the rear of the electromagnetic clutch 11 in the axial direction of the field core 16.

The terminal block body 51 closes one end of the inner tube 42, forming a recessed portion 59 open in the annular groove 31 of the field core 16. The pair of terminals 44 is provided on the rear surface of the terminal block body 51. The pair of terminals 44 are buried in the terminal block body 51 by insert molding. The pair of terminals 44, that is, first terminal 44a and second terminal 44b are disposed side by side at a predetermined interval in the above-described tangential direction A.

Figure 8:
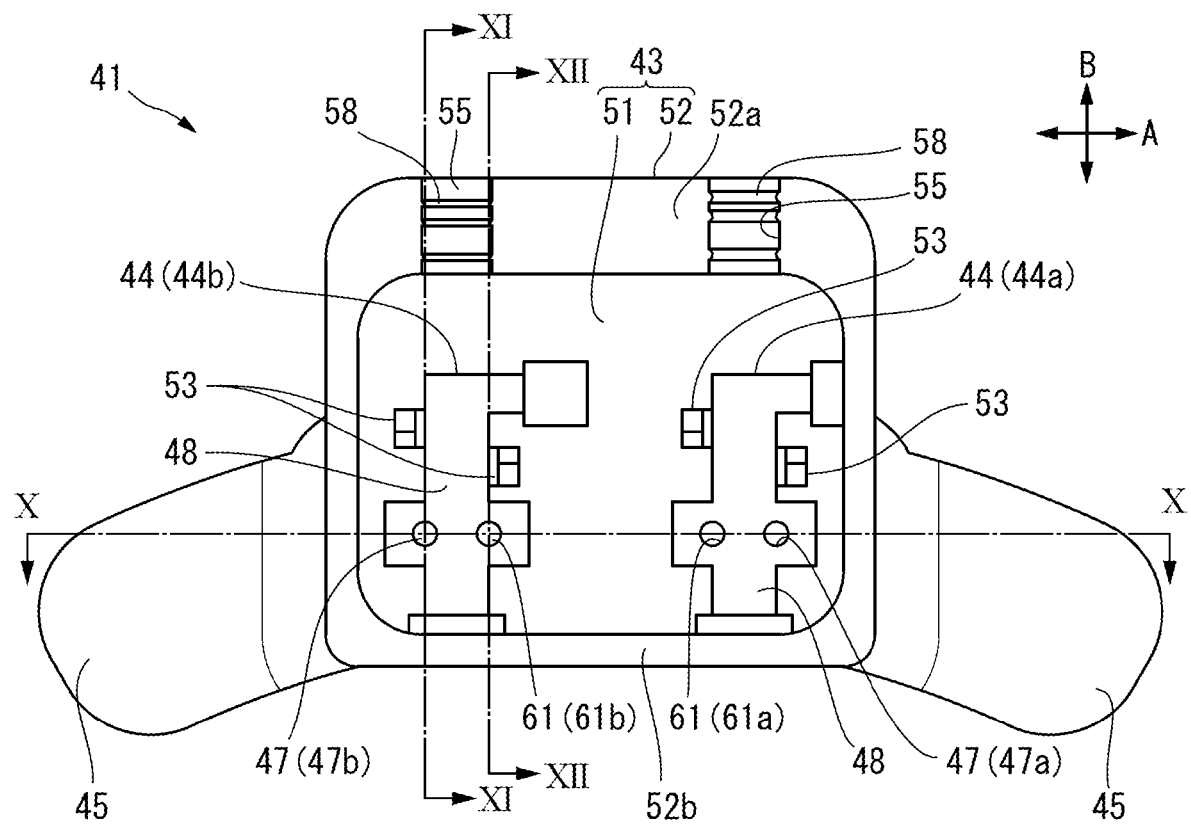
FIG. 8 is a plan view of the terminal block according to the first embodiment.

As shown in FIG. 8, each terminal 44 includes the plate portion 48 extending along the flat external surface of the terminal portion 43 inside the outer tube 52, and a plurality of projecting portions 53 that are bent up from the plate portion 48 and project from the terminal block body 51 toward the rear of the electromagnetic clutch 11. The plate portion 48 is formed to be long in a radial direction B of the field core 16 perpendicular to the tangential direction A of the field core 16. The terminal 44 is buried in the terminal portion 43 so that the surface of the plate portion 48 is exposed to the surface of the terminal block body 51. The projecting portions 53 are provided on the two ends (two sides) of the plate portion 48 in the tangential direction A.

As shown in FIG. 8, the outer tube 52 are formed into a square tube shape whose corners are rounded when viewed from the axial direction of the field core 16. The outer tube 52 is formed so that its opening extends in the tangential direction A and radial direction B of the field core 16. As shown in FIG. 6, the inside of the outer tube 52 is finally filled with a sealer 54 and sealed with the sealer 54.

The outer tube 52 includes two side walls 52a and 52b extending in the tangential direction A. As shown in FIGS. 7 and 8, one side wall 52a positioned outside (upper side in FIG. 8) the field core 16 in the radial direction is thicker than the other side wall 52b. A pair of grooves 55 are formed in the side wall 52a.

The pair of grooves 55 form a pair of lead wire holding portions for holding a pair of external connection lead wires 56 and 57 used to supply power to the electromagnetic coil 17. The pair of grooves 55 pass through the side wall 52a in the thickness direction (radial direction B) at positions adjacent to the pair of terminals 44 provided on the terminal block body 51. A plurality of lips 58 are formed on the walls of the pair of grooves 55 and engage with coatings 56a and 57a (see FIG. 7) of the lead wires 56 and 57 to prevent removal of the lead wires 56 and 57. The lead wires 56 and 57 are leaded through the pair of grooves 55 and held by the terminal block 41 in a state in which conductors 56b and 57b exposed at the tips of the lead wires 56 and 57 are located along the terminals 44.

One of the paired external connection lead wires 56 and 57 will be called the first lead wire 56, and the other one of the paired external connection lead wires 56 and 57 will be called the second lead wire 57. As shown in FIG. 6, the conductor 56b of the first lead wire 56 is guided onto the first terminal 44a so as to cross the winding start end 34a of the magnet wire 34 inserted in the first through hole 47a, and is soldered to the first terminal 44a by the solder 49 together with the winding start end 34a. The conductor 57b of the second lead wire 57 is guided onto the second terminal 44b so as to cross the winding termination end 34b, and is soldered to the second terminal 44b by the solder 50 together with the winding termination end 34b.

Figure 12:
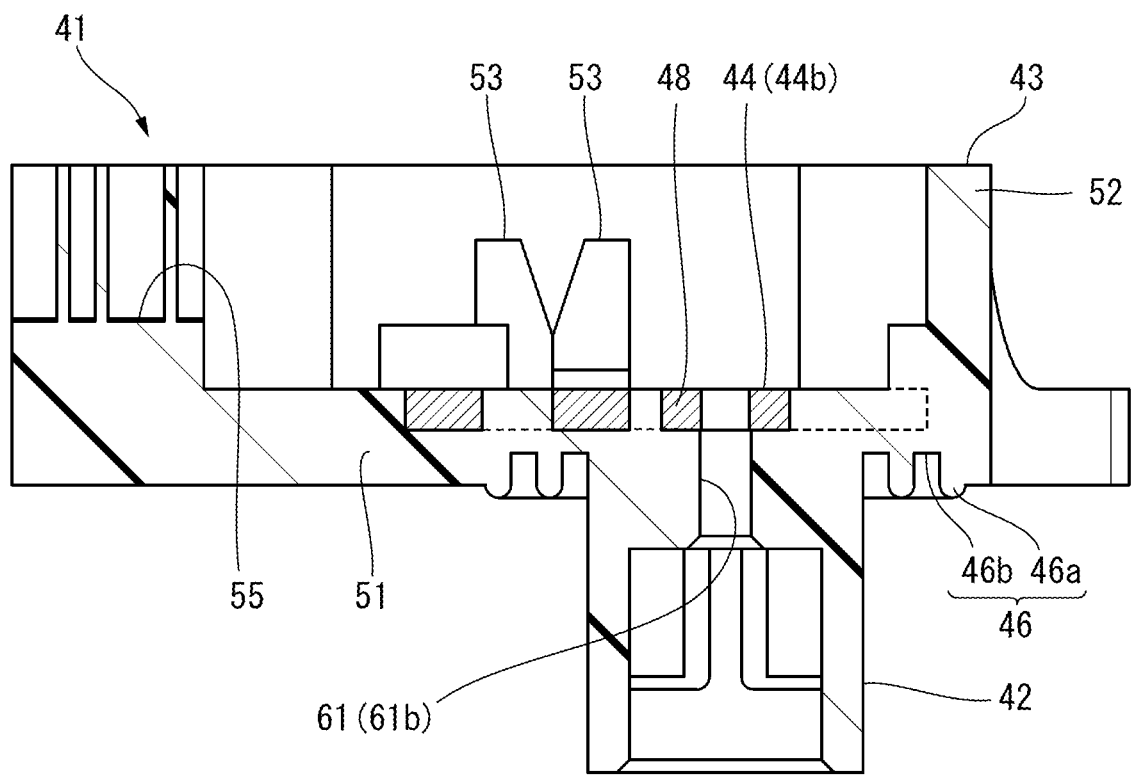
FIG. 12 is a sectional view taken along a line XII-XII in FIG. 8.

As shown in FIG. 10, a second pair of through holes 61 (61a and 61b) are bored at positions adjacent to the first pair of through holes 47 (47a and 47b) inside the inner tube 42 in the terminal block body 51. The second pair of through holes 61 include the third through hole 61a and the fourth through hole 61b. As shown in FIG. 12, the second pair of through holes 61 pass through the plate portions 48 of the pair of terminals 44 and the terminal block body 51. The second pair of through holes 61 make the outside of the field core 16 and the inside of the annular groove 31 of the field core 16 communicate with each other in a state in which the terminal block 41 is attached to the field core 16.

As shown in FIGS. 9 and 10, four protrusions 62 are provided inside with respect to the second pair of through holes 61 when the terminal block 41 is viewed from the field core 16. The protrusions 62 are disposed at two portions in the tangential direction A on the front surface (surface facing the field core 16) of the terminal block body 51, and two portions in the radial direction B. As shown in FIG. 6, a package 63a of a diode 63 is inserted in a space defined by the four protrusions 62.

The diode 63 forms a surge voltage absorber that absorbs a surge voltage generated when power supply to the electromagnetic coil 17 is stopped. The diode 63 includes the package 63a formed into a columnar shape, a third lead wire 63b leaded out from one end of the package 63a, and a fourth lead wire 63c leaded out from the other end of the package 63a.

The third lead wire 63b of the diode 63 passes through the third through hole 61a out of the second pair of through holes 61, and projects from the first terminal 44a. The third lead wire 63b sandwiches the conductor 56b of the first lead wire 56 together with the winding start end 34a of the magnet wire 34 projecting from the first terminal 44a, and is soldered to the first terminal 44a together with the winding start end 34a and the conductor 56b. Thus, the winding start end 34a of the magnet wire 34, the first lead wire 56, and the third lead wire 63b of the diode 63 are electrically connected to each other via the solder 49 on the first terminal 44a.

The fourth lead wire 63c of the diode 63 passes through the fourth through hole 61b out of the second pair of through holes 61, and projects from the second terminal 44b. The fourth lead wire 63c sandwiches the conductor 57b of the second lead wire 57 together with the winding termination end 34b of the magnet wire 34 projecting from the second terminal 44b, and is soldered to the second terminal 44b together with the winding termination end 34b and the conductor 57b. Hence, the winding termination end 34b of the magnet wire 34, the second lead wire 57, and the fourth lead wire 63c of the diode 63 are electrically connected to each other via the solder 50 on the second terminal 44b.

As shown in FIG. 2, the support pieces 45 of the terminal block 41 are formed along the rear surface 16a of the field core 16, and inserted between projecting pieces 64 provided on the mounting plate 15 and the rear surface 16a. The projecting pieces 64 and the rear surface 16a sandwich the support pieces 45.

When assembling the electromagnetic clutch 11 having this structure, first, the terminal block 41 is attached to the field core 16. At this time, the diode 63 is attached in advance to the inside (recessed portion 59) of the inner tube 42 of the terminal block 41, the third lead wire 63b is inserted into the third through hole 61a, and the fourth lead wire 63c is inserted into the fourth through hole 61b. When attaching the terminal block 41 to the field core 16, the projecting pieces 64 of the mounting plate 15 are plastically deformed to press the support pieces 45 against the field core 16.

Then, the winding start end 34a of the magnet wire 34 of the field core 16 is inserted into the first through hole 47a, the winding termination end 34b is inserted into the second through hole 47b, and the electromagnetic coil 17 is inserted in the annular groove 31 of the field core 16. The cast resin 37 is injected into the annular groove 31 and solidified.

The external connection lead wires 56 and 57 are leaded through the paired grooves 55 of the terminal block 41, and the conductors 56b and 57b of the lead wires 56 and 57 are guided onto the paired terminals 44. At this time, the coatings 56a and 57a of the lead wires 56 and 57 are leaded and held between the paired projecting portions 53 of the terminals 44a and 44b, respectively. As shown in FIG. 6, the conductors 56b and 57b of the lead wires 56 and 57 are inserted between the winding start end 34a and winding termination end 34b of the magnet wire 34 and the lead wires 63b and 63c of the diode 63 on the terminals 44a and 44b, respectively. For the respective terminals 44a and 44b, the conductors 56b and 57b, the winding start end 34a and winding termination end 34b, and the lead wires 63b and 63c are soldered to the terminals 44a and 44b.

After the soldering, the sealer 54 is injected into the outer tube 52, sealing the inside of the outer tube 52.

In the electromagnetic clutch 11, connecting portions between the magnet wire 34 and the external connection lead wires 56 and 57 are provided inside the terminal block 41 and outside the field core 16. This can minimize a dead space generated in the annular groove 31 of the field core 16. Compared to a related electromagnetic coupling device, the field core 16 can be downsized in the axial direction or the number of turns of the electromagnetic coil 17 can be increased.

The lead wires 56 and 57 and the diode 63 can be connected to the electromagnetic coil 17 on the terminal block 41. Compared to the electromagnetic coil of the related electromagnetic coupling device, the number of wire terminals of various types can be decreased and insulation processing on the electromagnetic coil 17 can be simplified.

The terminal block 41 according to the embodiment includes the pair of grooves 55 (lead wire holding portions) holding the pair of external connection lead wires 56 and 57 along the pair of terminals 44. The first lead wire 56 is guided onto the first terminal 44a so as to cross the winding start end 34a of the magnet wire 34. The second lead wire 57 is guided onto the second terminal 44b so as to cross the winding termination end 34b of the magnet wire 34.

When the external connection lead wires 56 and 57 are held in the grooves 55 of the terminal block 41, the conductors 56b and 57b sometimes float from the terminals 44a and 44b. In this case, it becomes difficult to solder the conductors 56b and 57b to the terminals 44a and 44b. However, the conductors 56b and 57b are guided onto the terminals 44a and 44b to cross the magnet wire 34, so the conductors 56b and 57b settle into the solders 49 and 50 swelling from the terminals 44a and 44b along the magnet wire 34 and are also soldered. This structure can facilitate and ensure soldering.

In the embodiment, the diode 63 (surge voltage absorber) is contained in the terminal block 41 (recessed portion 59 in the inner tube 42), and includes one end (lead wire 63b) connected to the first terminal 44a and the other end (lead wire 63c) connected to the second terminal 44b. The electromagnetic clutch 11 according to the embodiment has a structure in which the external connection lead wires 56 and 57 are connected to the field core assembly including the field core 16, the electromagnetic coil 17, the terminal block 41, and the diode 63. As the external connection lead wires 56 and 57, lead wires adaptable to the use environment of the electromagnetic clutch 11 can be used. That is, various lead wire specification requirements can be met by preparing lead wire assemblies for respective specifications. In this case, the field core assembly can be prepared as a common part.

In the embodiment, the diode 63 is used as a surge voltage absorber. The second pair of through holes 61 that make the outside of the field core 16 and the inside of the annular groove 31 communicate with each other are bored at positions adjacent to the first pair of through holes 47 in the terminal block 41 and the pair of terminals 44. The second pair of through holes 61 include the third through hole 61a and the fourth through hole 61b. The third lead wire 63b and fourth lead wire 63c of the diode 63 are leaded through the third through hole 61a and the fourth through hole 61b. The third lead wire 63b sandwiches the conductor 56b of the first lead wire 56 together with the winding start end 34a of the magnet wire 34, and is soldered to the first terminal 44a together with the winding start end 34a and the conductor 56b. The fourth lead wire 63c sandwiches the conductor 57b of the second lead wire 57 together with the winding termination end 34b of the magnet wire 34, and is soldered to the second terminal 44b together with the winding termination end 34b and the conductor 57b. The conductors 56b and 57b settle into the centers of the solders swelling from the terminals 44a and 44b along the magnet wire 34 and the lead wires 63b and 63c of the diode 63. As a result, the soldering reliability becomes higher and the soldering work becomes easier.

Second Embodiment

Figure 13A:
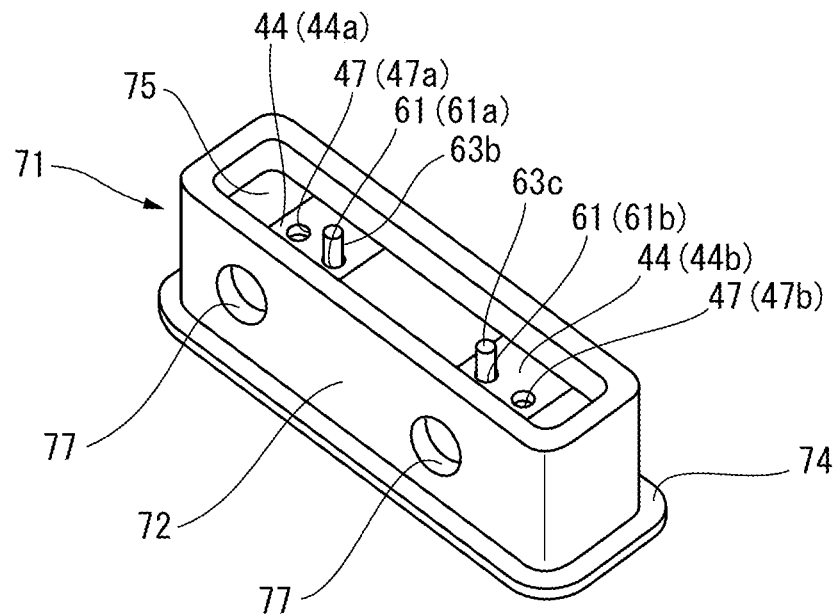
FIGS. 13A and 13B are perspective views of a terminal block according to the second embodiment.
Figure 13B:
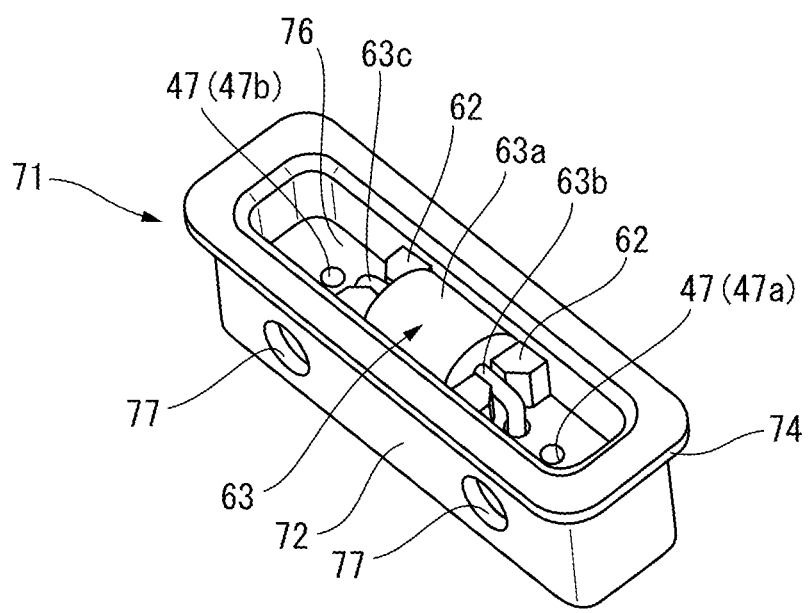
Figure 14:
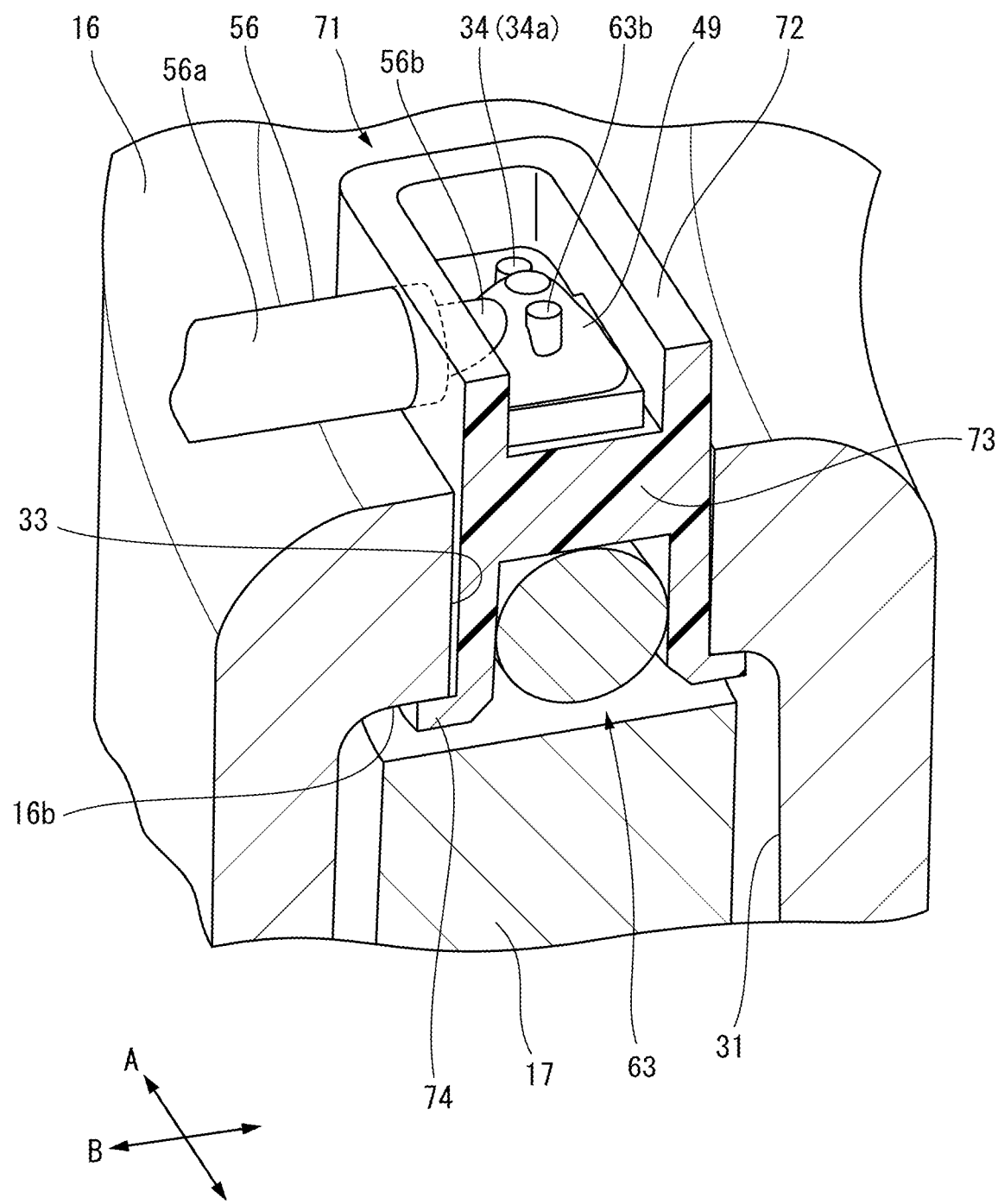
FIG. 14 is a perspective sectional view of the terminal block according to the second embodiment.

A terminal block can be constituted as shown in FIGS. 13A, 13B, and 14. In FIGS. 13A, 13B, and 14, the same reference numerals as those in FIGS. 1 to 12 denote the same or similar parts, and a detailed description thereof will not be repeated.

A terminal block 71 shown in FIGS. 13A and 13B includes a tube 72 having a square tube shape, and a plate-like terminal block body 73 provided inside the tube 72. As shown in FIG. 14, the tube 72 is fitted in a hole 33 of a field core 16, and part of the tube 72 projects outside the field core 16. The terminal block body 73 and part (portion surrounding the terminal block body 73 and an outer end projecting outside the field core 16) of the tube 72 correspond to the terminal portion 43 in the first embodiment.

The inner end of the tube 72 positioned inside an annular groove 31 of the field core 16 includes a flange 74 having an outer diameter larger than the opening width of the hole 33. The tube 72, the terminal block body 73, and the flange 74 are integrally formed from an insulating plastic material. The terminal block 71 is fitted in the hole 33 from inside the annular groove 31 in a state in which the flange 74 contacts an inner bottom surface 16b of the field core 16.

The terminal block body 73 partitions the inside of the tube 72 into an outer space 75 (see FIG. 13A) open toward the outside of the field core 16, and an inner space 76 (see FIG. 13B) open inside the annular groove 31 of the field core 16. The inner space 76 corresponds to the recessed portion 59 in the first embodiment. A pair of terminals 44 are buried in the terminal block body 73 by insert molding. The surfaces of the terminals 44 are exposed in the outer space 75.

In the pair of terminals 44, a first pair of through holes 47 and a second pair of through holes 61 are open. The first and second pairs of through holes 47 and 61 pass through the terminals 44 and the terminal block body 73. A winding start end 34a and winding termination end 34b of a magnet wire 34 are leaded through a first through hole 47a and second through hole 47b included in the first pair of through holes 47. A third lead wire 63b and fourth lead wire 63c of a diode 63 serving as a surge voltage absorber contained in the inner space 76 (inside the terminal block 71) inside the tube 72 are leaded through a third through hole 61a and fourth through hole 61b included in the second pair of through holes 61.

Figure 15:
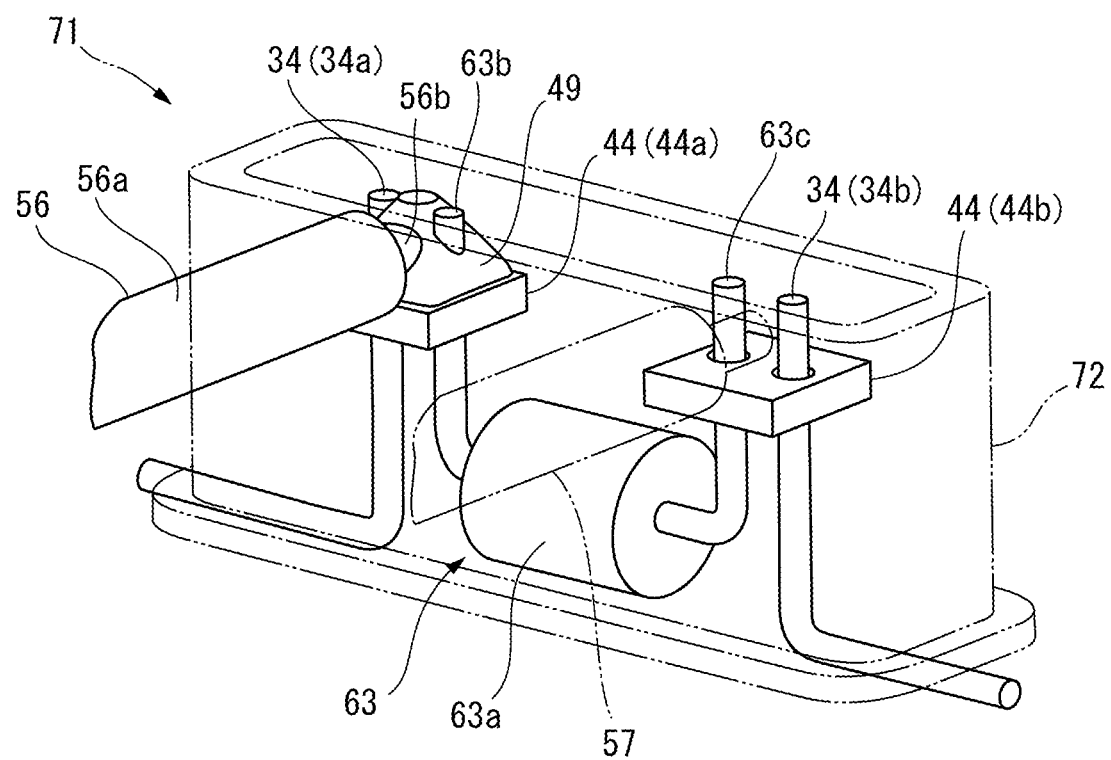
FIG. 15 is a perspective view for explaining the wiring of the terminal block according to the second embodiment.

A pair of through holes 77 for holding a pair of external connection lead wires 56 and 57 are formed at the outer end of the tube 72 that projects outside the field core 16. The through holes 77 constitute a pair of lead wire holding portions. As shown in FIG. 14, the through holes 77 are outer portions of the tube 72 in the radial direction of the field core 16, and are formed to pass through portions adjacent to the pair of terminals 44 in the radial direction B of the field core 16. By leading the lead wires 56 and 57 through the through holes 77, conductors 56b and 57b of the lead wires 56 and 57 cross the ends 34a and 34b of the magnet wire 34 and the lead wires 63b and 63c of the diode 63 that project on terminals 44a and 44b, and the conductors 56b and 57b are inserted between the ends 34a and 34b of the magnet wire 34 and the lead wires 63b and 63c, as shown in FIG. 15. The ends 34a and 34b of the magnet wire 34, the lead wires 63b and 63c, and the conductors 56b and 57b are soldered to the terminals 44a and 44b by solders 49 and 50. Although not shown, a space in the outer end of the tube 72, that is, the outer space 75 is filled with a sealer 54 and sealed after the end of soldering.

The terminal block 71 according to the embodiment is inserted into the hole 33 from inside the annular groove 31 of the field core 16, and attached to the field core 16. The diode 63 is attached in advance to the terminal block 71. The magnet wire 34 is leaded through the first pair of through holes 47, an electromagnetic coil 17 is contained in the annular groove 31, and then the annular groove 31 is filled with a cast resin 37. The cast resin 37 is solidified, fixing the terminal block 71 to the field core 16.

Also in this embodiment, connecting portions between the magnet wire 34 and the external connection lead wires 56 and 57 are provided inside the terminal block 71 and outside the field core 16. This can minimize a dead space generated in the annular groove 31 of the field core 16. Compared to a related electromagnetic coupling device, the field core 16 can be downsized in the axial direction or the number of turns of the electromagnetic coil 17 can be increased.

Third Embodiment

Figure 16:
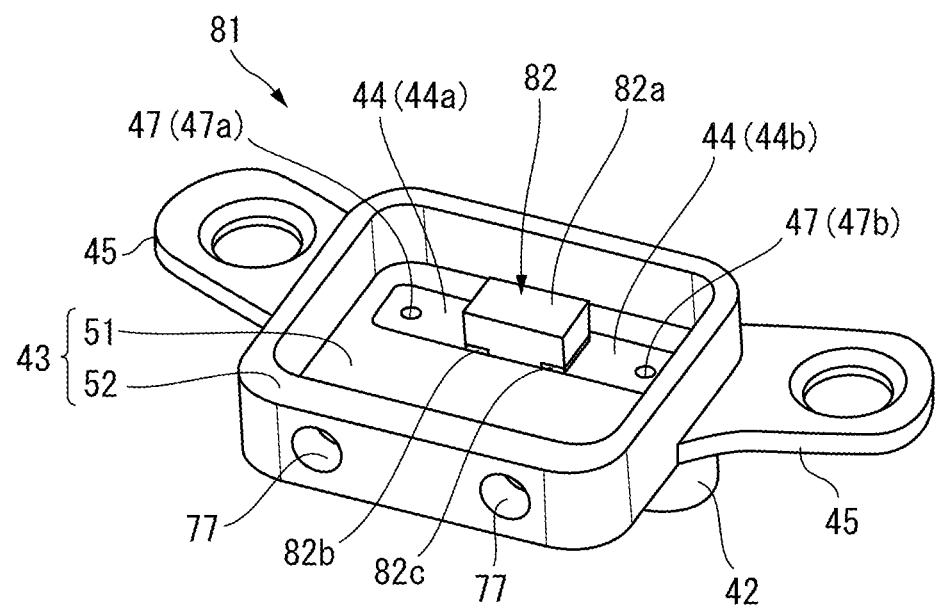
FIG. 16 is a perspective view of a terminal block according to the third embodiment.
Figure 17:
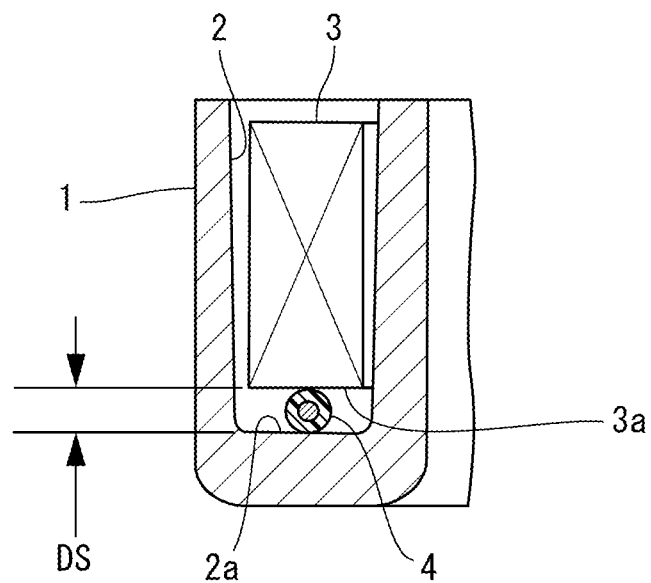
FIG. 17 is a sectional view showing part of a related field core.

A terminal block can be constituted as shown in FIG. 16. In FIG. 16, the same reference numerals as those in FIGS. 1 to 15 denote the same or similar parts, and a detailed description thereof will not be repeated.

A terminal block 81 shown in FIG. 16 includes an inner tube 42, a terminal portion 43, a pair of terminals 44, and a pair of support pieces 45. The terminal portion 43 includes a terminal block body 51 and an outer tube 52. A pair of through holes 77 (pair of lead wire holding portions) for holding a pair of external connection lead wires 56 and 57 are formed in the outer tube 52. However, the second pair of through holes 61 in the above-described embodiments are not provided in the terminal block 81.

A diode 82 serving as a surge voltage absorber is mounted on the surfaces of the pair of terminals 44. The diode 82 according to the embodiment is a surface mount device including a prismatic package 82a, and first and second soldering lands 82b and 82c respectively provided at one and the other ends of the package 82a. The diode 82 is mounted on the surfaces of the terminals 44a and 44b via solders (not shown) in a state in which the first land 82b and the second land 82c are overlaid on the first terminal 44a and second terminal 44b of the terminal block 81.

As described in the embodiment, the surge voltage absorber (diode 82) is mounted on the surface of the terminal block 81. Compared to a case in which a surge voltage absorber having lead wires is used, the wiring work of the surge voltage absorber is simplified, increasing the productivity of the electromagnetic coupling device.

Although not shown, after the diode 82 is mounted on the surface, the inside of the outer tube 52 is filled with a sealer 54 and sealed. Similar to the above-described embodiments, the surge voltage absorber (diode 82) is contained in the terminal block.

In the above-described first to third embodiments, the present invention is applied to an electromagnetic clutch. However, the present invention is not limited to this and can be applied to another electromagnetic coupling device such as an electromagnetic brake.

(Aspects of Invention)

The present invention includes the following aspects.

According to the first aspect of an electromagnetic coupling device of the present invention, there is provide an electromagnetic coupling device comprising: an electromagnetic coil (17) formed by winding a magnet wire (34) including a winding start end (34a) and a winding termination end (34b); a pair of external connection lead wires including a first lead wire (56) and a second lead wire (57); a field core (16) including a recessed portion (31) containing the electromagnetic coil, and a hole (33) passing through a wall of the recessed portion; and a terminal block (41) inserted in the hole and supported by the field core, wherein the terminal block includes: a terminal portion (43) projecting outside the field core; a pair of terminals (44) provided at the terminal portion and including a first terminal (44a) and a second terminal (44b); and a first pair of through holes (47) including a first through hole (47a) and a second through hole (47b) that pass through the terminal block via the first terminal and the second terminal, respectively, and make an outside of the field core and an inside of the recessed portion communicate with each other, the winding start end passes through the first through hole, projects from the first terminal, and is soldered to the first terminal together with the first lead wire, and the winding termination end passes through the second through hole, projects from the second terminal, and is soldered to the second terminal together with the second lead wire.

According to the first aspect, the external connection lead wires are connected to the magnet wire outside the field core, so no space is necessary to lay out the external connection lead wires inside the field core. A dead space generated between the field core and the electromagnetic coil is reduced, and the field core can be downsized in the axial direction or the number of turns of the electromagnetic coil can be increased. Note that the hole of the field core may pass through a bottom wall (32) of the recessed portion. The recessed portion may include the bottom wall, and two side walls sandwiching the bottom wall. The terminal portion may be formed from an insulating material.

According to the second aspect of the electromagnetic coupling device of the present invention, in the first aspect, the terminal block further includes a pair of lead wire holding portions (55) holding the pair of external connection lead wires along the pair of terminals, the first lead wire is guided onto the first terminal to cross the winding start end, and the second lead wire is guided onto the second terminal to cross the winding termination end.

According to the third aspect of the electromagnetic coupling device of the present invention, in the first or second aspect, the electromagnetic coupling device further comprises a surge voltage absorber (63) contained in the terminal block, and including one end connected to the first terminal and the other end connected to the second terminal.

According to the fourth aspect of the electromagnetic coupling device of the present invention, in the second aspect, the electromagnetic coupling device further comprises a surge voltage absorber (63) contained in the terminal block, and including a third lead wire (63b) connected to the first terminal and a fourth lead wire (63c) connected to the second terminal, the terminal block further includes a second pair of through holes (61) including a third through hole (61a) and a fourth through hole (61b) that are bored at positions adjacent to the first through hole and the second through hole through the first terminal and the second terminal, respectively, and make the outside of the field core and the inside of the recessed portion communicate with each other, the third lead wire of the surge voltage absorber projects from the first terminal through the third through hole, sandwiches the first lead wire together with the winding start end, and is soldered to the first terminal together with the winding start end and the first lead wire, and the fourth lead wire of the surge voltage absorber projects from the second terminal through the fourth through hole, sandwiches the second lead wire together with the winding termination end, and is soldered to the second terminal together with the winding termination end and the second lead wire.

According to the fifth aspect of the electromagnetic coupling device of the present invention, in the third aspect, the surge voltage absorber is configured as a surface mount device including a package (82a), and first and second soldering lands (82b, 82c) respectively provided at one end and the other end of the package, and is mounted in a state in which the first and second soldering lands are overlaid on the first and second terminals.

According to the sixth aspect of the electromagnetic coupling device of the present invention, in any one of the first to fifth aspects, the terminal block further includes an inner tube (42) fitted in the hole, the terminal portion is connected to an end of the inner tube that is positioned outside the field core, and the first pair of through holes are formed in the inner tube and the terminal portion. The terminal portion closes the end of the inner tube, forming a recessed portion (59) open in the recessed portion of the field core. The recessed portion may contain the surge voltage absorber. The inner tube may be formed from an insulating material.

According to the seventh aspect of the electromagnetic coupling device of the present invention, in any one of the first to sixth aspects, the terminal block further includes a support piece (45) projecting from the terminal portion along an external surface of the field core. The support piece may be formed from an insulating material. The support piece may include a plurality of pieces (45).

According to the eighth aspect of the electromagnetic coupling device of the present invention, in the sixth aspect, the electromagnetic coupling device further comprises an insulator (37) filled in the recessed portion in a state in which the electromagnetic coil is contained in the recessed portion, and the terminal block further includes: a support piece (45) projecting from the terminal portion along an external surface of the field core; and a seal (46) formed to surround the inner tube on surfaces of the terminal portion and the support piece that face the field core. The seal may include a concentric ridge (46a) and groove (46b). The seal may include a structure in which a plurality of ridges (46a) and a plurality of grooves (46b) are laid out alternately. The support piece may include a plurality of pieces (45).

According to the ninth aspect of the electromagnetic coupling device of the present invention, in the sixth aspect, the terminal portion includes: a plate-like terminal block body (51) connected to the end of the inner tube; and an outer tube (52) projecting from the terminal block body in an axial direction of the field core, and the pair of terminals are formed on the terminal block body. The inside of the outer tube may be sealed with a sealer (54).

According to the 10th aspect of the electromagnetic coupling device of the present invention, in any one of the first to ninth aspects, each of the pair of terminals includes: a plate portion (48) extending along a flat external surface of the terminal portion; and a plurality of projecting portions (53) provided on two sides of the plate portion.

According to the 11th aspect of the electromagnetic coupling device of the present invention, in any one of the first to fifth aspects, the terminal block (71) includes: a tube (72) fitted in the hole of the field core and including an outer end projecting outside the field core; and a plate-like terminal block body (73) provided inside the tube, and the terminal portion is formed from the outer end of the tube and the terminal block body. The terminal portion may be constituted by a portion of the tube that surrounds the terminal block body, in addition to the outer end of the tube and the terminal block body. The pair of terminals may be formed on the terminal block body. The first pair of through holes may pass through the pair of terminals and the terminal block body. The second pair of through holes may pass through the pair of terminals and the terminal block body. The terminal block body may partition the inside of the tube into an outer space (75) open toward the outside of the field core, and an inner space (76) open inside the recessed portion of the field core. The inner space may contain the surge voltage absorber. The tube and the terminal block body may be formed from an insulating material.

According to the 12th aspect of the electromagnetic coupling device of the present invention, in the 11th aspects, the tube further includes an inner end positioned inside the recessed portion of the field core, and the terminal block further includes a flange (74) provided at the inner end and having an outer diameter larger than an opening width of the hole. The flange may be formed from an insulating material.

According to the 13th aspect of the electromagnetic coupling device of the present invention, in any one of the first to 12th aspects, the electromagnetic coupling device further comprises: a rotating shaft (13); a hub (23) fixed to the rotating shaft; an armature (25) supported by the hub via a leaf spring (24); and a rotor (19) including a groove (19a) in which the field core is inserted, and a frictional surface (19c) facing the armature.

What is claimed is:

1. An electromagnetic coupling device comprising:
   an electromagnetic coil formed by winding a magnet wire including a winding start end and a winding termination end;
   a pair of external connection lead wires including a first lead wire and a second lead wire;
   a field core including a recessed portion containing the electromagnetic coil, and a hole passing through a wall of the recessed portion; and
   a terminal block inserted in the hole and supported by the field core,
   wherein the terminal block includes:
   a terminal portion projecting outside the field core;
   a pair of terminals provided at the terminal portion and including a first terminal and a second terminal; and
   a first pair of through holes including a first through hole and a second through hole that pass through the terminal block via the first terminal and the second terminal, respectively, and make an outside of the field core and an inside of the recessed portion communicate with each other,
   the winding start end passes through the first through hole, projects from the first terminal, and is soldered to the first terminal together with the first lead wire, and
   the winding termination end passes through the second through hole, projects from the second terminal, and is soldered to the second terminal together with the second lead wire.

2. The device according to claim 1, wherein the terminal block further includes a pair of lead wire holding portions holding the pair of external connection lead wires along the pair of terminals,
   the first lead wire is guided onto the first terminal to cross the winding start end, and
   the second lead wire is guided onto the second terminal to cross the winding termination end.

3. The device according to claim 1, further comprising a surge voltage absorber contained in the terminal block, and including one end connected to the first terminal and the other end connected to the second terminal.

4. The device according to claim 2, further comprising a surge voltage absorber contained in the terminal block, and including a third lead wire connected to the first terminal and a fourth lead wire connected to the second terminal,
   wherein the terminal block further includes a second pair of through holes including a third through hole and a fourth through hole that are bored at positions adjacent to the first through hole and the second through hole through the first terminal and the second terminal, respectively, and make the outside of the field core and the inside of the recessed portion communicate with each other,
   the third lead wire of the surge voltage absorber projects from the first terminal through the third through hole, sandwiches the first lead wire together with the winding start end, and is soldered to the first terminal together with the winding start end and the first lead wire, and
   the fourth lead wire of the surge voltage absorber projects from the second terminal through the fourth through hole, sandwiches the second lead wire together with the winding termination end, and is soldered to the second terminal together with the winding termination end and the second lead wire.

5. The device according to claim 3, wherein the surge voltage absorber is configured as a surface mount device including a package, and first and second soldering lands respectively provided at one end and the other end of the package, and is mounted in a state in which the first and second soldering lands are overlaid on the first and second terminals.

6. The device according to claim 1, wherein the terminal block further includes an inner tube fitted in the hole,
   the terminal portion is connected to an end of the inner tube that is positioned outside the field core, and
   the first pair of through holes are formed in the inner tube and the terminal portion.

7. The device according to claim 1, wherein the terminal block further includes a support piece projecting from the terminal portion along an external surface of the field core.

8. The device according to claim 6, further comprising an insulator filled in the recessed portion in a state in which the electromagnetic coil is contained in the recessed portion,
   wherein the terminal block further includes:
   a support piece projecting from the terminal portion along an external surface of the field core; and
   a seal formed to surround the inner tube on surfaces of the terminal portion and the support piece that face the field core.

9. The device according to claim 6, wherein the terminal portion includes:
   a plate-like terminal block body connected to the end of the inner tube; and
   an outer tube projecting from the terminal block body in an axial direction of the field core, and
   the pair of terminals are formed on the terminal block body.

10. The device according to claim 1, wherein each of the pair of terminals includes:
    a plate portion extending along a flat external surface of the terminal portion; and
    a plurality of projecting portions provided on two sides of the plate portion.

11. The device according to claim 1, wherein the terminal block includes:
    a tube fitted in the hole of the field core and including an outer end projecting outside the field core; and
    a plate-like terminal block body provided inside the tube, and
    the terminal portion is formed from the outer end of the tube and the terminal block body.

12. The device according to claim 11, wherein the tube further includes an inner end positioned inside the recessed portion of the field core, and
    the terminal block further includes a flange provided at the inner end and having an outer diameter larger than an opening width of the hole.

13. The device according to claim 1, further comprising:
    a rotating shaft;
    a hub fixed to the rotating shaft;
    an armature supported by the hub via a leaf spring; and
    a rotor including a groove in which the field core is inserted, and a frictional surface facing the armature.

* * * * *